United States Patent
DeVos et al.

(10) Patent No.: US 12,473,002 B1
(45) Date of Patent: Nov. 18, 2025

(54) METHODS AND SYSTEMS FOR ULTRA-WIDEBAND (UWB) BASED NAVIGATION OF ARBITRARY PATHS BASED ON REFERENCE MARKERS

(71) Applicant: Metrom Rail, LLC, Crystal Lake, IL (US)

(72) Inventors: John K. DeVos, Round Lake, IL (US); Kurt Gunther, Woodstock, IL (US)

(73) Assignee: METROM RAIL, LLC, Lakemoor, IL (US)

( * ) Notice: Subject to any disclaimer, the term of this patent is extended or adjusted under 35 U.S.C. 154(b) by 945 days.

(21) Appl. No.: 16/859,273

(22) Filed: Apr. 27, 2020

Related U.S. Application Data

(60) Provisional application No. 62/839,369, filed on Apr. 26, 2019.

(51) Int. Cl.
*B61L 27/40* (2022.01)
*B61L 15/00* (2006.01)
(Continued)

(52) U.S. Cl.
CPC ........... *B61L 27/40* (2022.01); *B61L 15/0018* (2013.01); *B61L 15/0072* (2013.01);
(Continued)

(58) Field of Classification Search
CPC .. B61L 27/40; B61L 15/0018; B61L 15/0072; B61L 25/021; B61L 25/023; B61L 27/70; B61L 2205/00
(Continued)

(56) References Cited

U.S. PATENT DOCUMENTS 2,188,293 A   1/1940   Williams
2,216,575 A   10/1940  Seinfeld et al.
(Continued)

FOREIGN PATENT DOCUMENTS

DE   102008020700   11/2009
EP   1785744        5/2007
(Continued)

OTHER PUBLICATIONS

Certified English-Language Translation of German Patent Application Pub. No. DE102008020700A1 ("Meyer"), 13 pages.
(Continued)

*Primary Examiner* — Zachary L Kuhfuss
(74) *Attorney, Agent, or Firm* — McAndrews, Held & Malloy, Ltd.

(57) ABSTRACT

Systems and methods are provided for ultra-wideband (UWB) based navigation of arbitrary paths based on reference markers. A train-mounted unit may be configured to, when deployed on a train, communicate with any wayside unit, from a plurality of wayside units configured for placement on or near tracks in a railway network, that comes within communication range of the train-mounted device, with the communicating including use of ultra-wideband (UWB) signals, and generate based on communication, train location information, with the generating of the train location information including determining based on processing of communicated UWB signals with at least one wayside unit, range to the at least one wayside unit, and determining based on the determined range to the at least one wayside unit, change in range ($\Delta R$) to the at least one wayside unit and change in location ($\Delta L$) on a track in the railway network.

24 Claims, 14 Drawing Sheets

(51) Int. Cl.
*B61L 25/02* (2006.01)
*B61L 27/70* (2022.01)
(52) U.S. Cl.
CPC ........... *B61L 25/021* (2013.01); *B61L 25/023* (2013.01); *B61L 25/026* (2013.01); *B61L 27/70* (2022.01); *B61L 25/025* (2013.01); *B61L 2205/00* (2013.01)
(58) Field of Classification Search
USPC .................................................. 701/19, 20
See application file for complete search history.

(56) References Cited

U.S. PATENT DOCUMENTS

| | | |
|---|---|---|
| 3,898,652 A | 8/1975 | Rashid |
| 5,036,478 A | 7/1991 | MacDougall |
| 5,283,589 A | 2/1994 | Blevins |
| 5,452,870 A | 9/1995 | Heggestad |
| 5,803,411 A | 9/1998 | Ackerman et al. |
| 5,907,294 A | 5/1999 | Welte et al. |
| 5,950,966 A | 9/1999 | Hungate et al. |
| 6,113,037 A | 9/2000 | Pace |
| 6,133,876 A | 10/2000 | Fullerton et al. |
| 6,338,152 B1 | 1/2002 | Fera et al. |
| 6,597,293 B1 | 7/2003 | Harrison |
| 6,631,322 B1 | 10/2003 | Arthur et al. |
| 6,759,948 B2 | 7/2004 | Grisham et al. |
| 6,957,131 B2 | 10/2005 | Kane et al. |
| 7,075,427 B1 | 7/2006 | Pace et al. |
| 7,148,791 B2 | 12/2006 | Grisham et al. |
| 7,725,252 B2 | 5/2010 | Heddebaut et al. |
| 8,200,380 B2 | 6/2012 | Ghaly |
| 8,812,227 B2* | 8/2014 | Carlson ................. G08G 1/166 701/300 |
| 8,874,359 B2 | 10/2014 | Douglas et al. |
| 9,043,131 B2* | 5/2015 | Carlson ............... B61L 15/0027 701/538 |
| 9,434,397 B2 | 9/2016 | Chung et al. |
| 9,606,217 B2 | 3/2017 | Bruemmer et al. |
| 9,731,738 B2* | 8/2017 | Carlson ................. B60T 8/1705 |
| 10,179,595 B2* | 1/2019 | Carlson ................. B61L 25/021 |
| 10,336,353 B2* | 7/2019 | Carlson ................. B61L 25/021 |
| 10,737,709 B2* | 8/2020 | Carlson ................. B61L 25/025 |
| 10,778,363 B2* | 9/2020 | Carlson .................. B61L 3/125 |
| 10,926,783 B2* | 2/2021 | Carlson ................. B61L 25/025 |
| 11,349,589 B2* | 5/2022 | Carlson ............... B61L 15/0058 |
| 11,492,027 B2* | 11/2022 | Carlson ................. G08B 21/043 |
| 11,700,075 B2* | 7/2023 | Carlson .................. B61L 27/70 246/193 |
| 11,780,481 B2* | 10/2023 | Carlson .................... G01S 19/17 246/122 R |
| 11,814,088 B2* | 11/2023 | Gunther .............. B61L 15/0081 |
| 11,952,028 B2* | 4/2024 | Carlson .................. B61L 27/70 |
| 11,965,952 B2* | 4/2024 | Gunther ................. G01S 13/04 |
| 12,122,436 B2* | 10/2024 | Carlson ..................... G01S 5/14 |
| 12,258,058 B2* | 3/2025 | Carlson ................. B61L 25/025 |
| 12,379,479 B2* | 8/2025 | Gunther ................. G01S 13/04 |
| 12,397,832 B2* | 8/2025 | Carlson .................. B61L 3/125 |
| 2004/0155822 A1 | 8/2004 | Lien |
| 2004/0240565 A1 | 12/2004 | Santhoff et al. |
| 2005/0143037 A1 | 6/2005 | Stratis et al. |
| 2006/0009240 A1 | 1/2006 | Katz |
| 2006/0151672 A1 | 7/2006 | Heddebaut et al. |
| 2006/0199146 A1 | 9/2006 | Mandelkern et al. |
| 2007/0241888 A1 | 10/2007 | MantoVani et al. |
| 2007/0255498 A1 | 11/2007 | McDaniel et al. |
| 2007/0281745 A1 | 12/2007 | Parkulo et al. |
| 2007/0293153 A1 | 12/2007 | Molisch et al. |
| 2008/0111688 A1 | 5/2008 | Nikitin et al. |
| 2008/0150786 A1 | 6/2008 | Breed |
| 2008/0170533 A1 | 7/2008 | Cyzs et al. |
| 2009/0243397 A1 | 10/2009 | Cook et al. |
| 2009/0253439 A1 | 10/2009 | Gantner et al. |
| 2009/0255329 A1 | 10/2009 | Connell et al. |
| 2010/0039978 A1 | 2/2010 | Rangan |
| 2010/0052945 A1 | 3/2010 | Breed |
| 2010/0124898 A1 | 5/2010 | Qu et al. |
| 2010/0235460 A1 | 9/2010 | Mochizuki et al. |
| 2011/0006912 A1* | 1/2011 | Sheardown ............. B61L 27/70 340/815.45 |
| 2011/0084854 A1 | 4/2011 | Johnson |
| 2012/0077537 A1 | 3/2012 | Muratov et al. |
| 2012/0182191 A1 | 7/2012 | King |
| 2012/0296562 A1* | 11/2012 | Carlson ................. B61L 25/025 701/301 |
| 2012/0326891 A1 | 12/2012 | Cross |
| 2013/0021215 A1 | 1/2013 | Suzuki et al. |
| 2013/0138276 A1 | 5/2013 | Soderi et al. |
| 2013/0214990 A1 | 8/2013 | Chiu |
| 2013/0237273 A1 | 9/2013 | Klein et al. |
| 2013/0256466 A1 | 10/2013 | Carlson et al. |
| 2014/0173155 A1 | 6/2014 | Slattery |
| 2015/0060608 A1* | 3/2015 | Carlson ................. B60T 8/1705 246/122 R |
| 2015/0097412 A1 | 4/2015 | Smith |
| 2015/0329130 A1* | 11/2015 | Carlson ................... B61L 27/40 246/122 R |
| 2016/0046308 A1* | 2/2016 | Chung ................ B61L 15/0027 701/20 |
| 2016/0176422 A1 | 6/2016 | Cross |
| 2019/0054942 A1* | 2/2019 | Carlson ................... H04W 4/42 |
| 2019/0071106 A1* | 3/2019 | Carlson ................... B61L 27/70 |
| 2019/0263432 A1* | 8/2019 | Carlson ................... H04W 4/42 |

FOREIGN PATENT DOCUMENTS

| | | |
|---|---|---|
| EP | 2571742 | 11/2009 |
| WO | 03009254 | 1/2003 |
| WO | 2011125074 | 10/2011 |
| WO | 2013056244 | 4/2013 |

OTHER PUBLICATIONS

IEEE Standard for Local and Metropolitan Area Networks: Part 15.4: Low-Rate Wireless Personal Area Networks (LR-WPANs), IEEE Std 802.15.4™—2011, Sep. 5, 2011, 314 pages.
Newton's Telecom Dictionary (27th ed 2013), 3 pages.
Time Domain's Ultra Wideband (UWB) Definition and Advantages, Time Domain (Mar. 2011), 14 pages.
Int. J. Its Res.(2016), "Assessment of the Contribution of Time Reversal of a UWB Localization System for Railway Application", 13 pages.
C. L. Bennett and G. F. Ross, "Time-domain electromagnetics and its applications," in Proceedings of the IEEE, vol. 66, No. 3, pp. 299-318, Mar. 1978, 23 pages.
An Outdoor UWB Tracking System to Improve Safety of Semi-Autonomous Vehicle Operations ("Richardson"), 13 pages.
"Driving Assistance Provided by Adaptive Cruise Control", P. Fancher, et al., University of Michigan Transportation Research Institute. 13 pages.
SAE J2735/2009-11, 359 pages.
"Operation of the Eaton VORAD Collision Warning System and Analysis of the Recorded Data", David A. Danaher, et al., Veritech Consulting Engineering, LLC., 10 pages.
"Transponder History—RADAR Identification of Aircraft", Experimental Aircraft Info, Jul. 20, 2022, 5 pages.
"Collision of Metrolink Train 111 With Union Pacific Train LOF65-12", National Transportation Safety Board Accident Report, Sep. 12, 2008, 83 pages.
"Collisions & Casualties by Year", Federal Railroad Administration, 3 pages.
"Fatal Crashes at Highway Rail Grade Crossings", International Journal of Transportation Science and Technology, vol. 11, Issue 1, Mar. 2022, 23 pages.
"Highway-Rail Grade Crossings Overview", U.S. Department of Transportation, Federal Railroad Administration, Last updated: Wednesday, Dec. 4, 2019, 2 pages.

(56) References Cited

OTHER PUBLICATIONS

"Railroad Accident: Common Causes, Statistics and Prevention", 10 pages.
Positive Train Control, May 2012, 25 pages.
"CCS: A Railway Corridor Control System Utilizing UWB Radio Technology", Paul A. Flaherty, 2004 ASME/IEEE Joint Rail Conference, Apr. 6-8, 2004, 4 pages.
ETSI Technical Report 101 538 V1.1.1 (Oct. 2012), 34 pages.
Declaration of Foster J. Peterson, 148 pages.
Curriculum Vitae of Foster J. Peterson, May 2023, 6 pages.
Opinion and Order (ECF 90), *Metrom* v. *Siemens*, Case No. 23-cv-5097, filed Jan. 29, 2024, 9 pages.
Second Amended Complaint (ECF 69-1), *Metrom* v. *Siemens*, Case No. 23-cv-5097, filed May 26, 2023, 356 pages.
United States Frequency Allocations—The Radio Spectrum (2003).
Fed. Reg., vol. 63, No. 140, pp. 39343-39357.
49 C.F.R. 236.0, Oct. 1, 2010 Edition, 3 pages.
George Bibel, "Train Wreck—The Forensics of Rail Disasters", 2012, 21 pages.
Report of the Railroad Safety Advisory Committee, "Implementation of Positive Train Control Systems", Sep. 8, 1999, 198 pages.
RFID Working on the Railroad, IEEE Potentials, Sep./Oct. 2015, 5 pages.
Standard for Automatic Equipment Identification, S-918, Feb. 1, 2003, 177 pages.
RFID Journal "South African Railroad Switches to Passive RFID", Jan. 26, 2007, 3 pages.
General Code of Operating Rules (GCOR), Sixth Edition effective Apr. 7, 2010, 152 pages.
NORAC Operating Rules, Tenth Edition, Nov. 6, 2011, Northeastern Operating Rule Advisory Committee, 154 pages.
Rules and Regulations, 42 F.R. 5065, 1 page.
Federal Railroad Administration, "Type Approval—Advanced Civil Speed Enforcement System (ACSES) II", May 27, 2010, 5 pages.
Petition for IPR—U.S. Pat. No. 9,731,738, 92 pages.
Canadian Office Action for Application No. 3071985, dated Oct. 23, 2024, 3 pages.

\* cited by examiner

METHODS AND SYSTEMS FOR ULTRA-WIDEBAND (UWB) BASED NAVIGATION OF ARBITRARY PATHS BASED ON REFERENCE MARKERS

CLAIM OF PRIORITY

This patent application makes reference to, claims priority to, and claims benefit from U.S. Provisional Patent Application Ser. No. 62/839,369, filed on Apr. 26, 2019. The above identified application is incorporated herein by reference in its entirety.

TECHNICAL FIELD

Aspects of the present disclosure relate to control technologies and solutions in conjunction with railway systems. More specifically, various implementations of the present disclosure relate to methods and systems for ultra-wideband (UWB) based navigation of arbitrary paths based on reference markers.

BACKGROUND

Various issues may exist with conventional approaches for controlling trains and operations thereof. In this regard, conventional systems and methods, if any existed, for managing navigation of trains along arbitrary paths, may be costly, inefficient, and cumbersome. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for ultra-wideband (UWB) based navigation of arbitrary paths based on reference markers, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
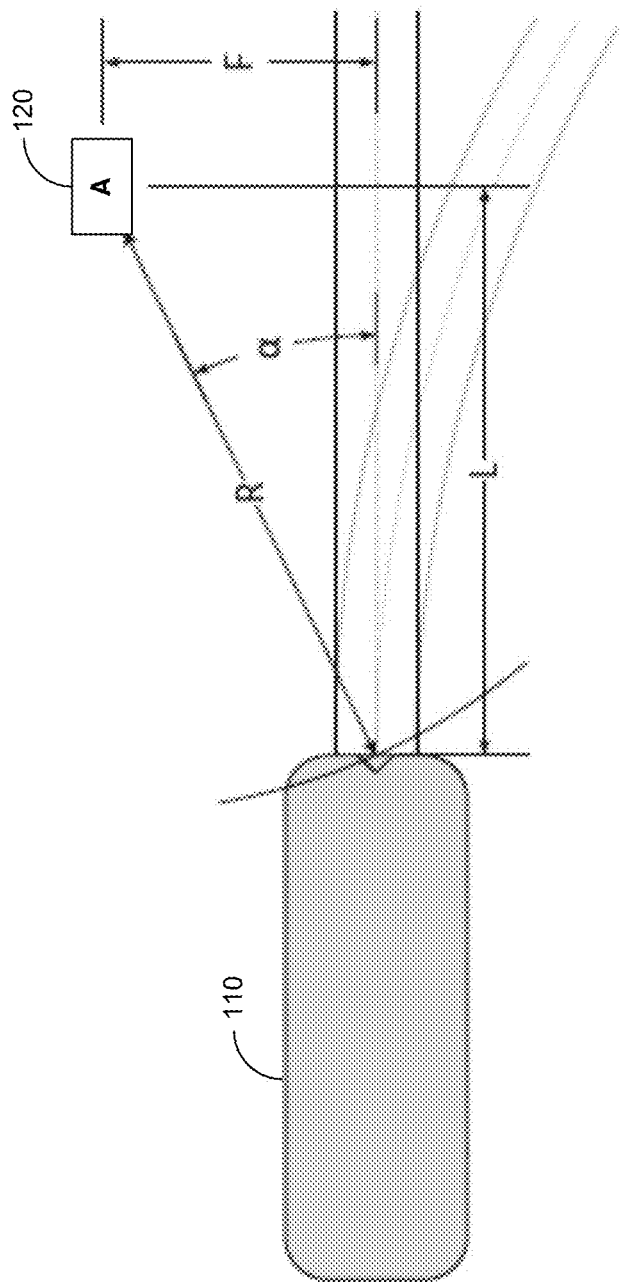
FIG. 1 illustrates ranging to an anchor by a train traversing a track.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein, "train" refers to any vehicle, car or the like that operates on train racks. This may include vehicles, cars or the like that operating individually (e.g., as single vehicle) or within a group (e.g., one of cars in a multi-car railway train). Further, as utilized herein a train may include powered vehicles, cars or the like (e.g., incorporating power means for driving the car or the vehicle, autonomously and/or based on power provided to the car or the vehicle from external sources) and/or non-powered cars or vehicles.

The present disclosure is directed to providing enhanced train control solutions, particularly by use of ultra-wideband (UWB) based navigation of arbitrary paths based on reference markers. In this regard, for automatic train control and protection applications, it is necessary for the control system to maintain "awareness" of the location of trains and other vehicles operating within the system. Greater accuracy and precision in train location translates into increased system capacity, which is needed by transit systems to accommodate growing demand.

Previously available means of train location determination suffer from deficiencies in accuracy and/or precision, compensation for which required operating assumptions that restrict system capacity. For example, a train's estimated location might include a large uncertainty buffer around the train to account for the worst-case error in the estimated location. This increases the spacing between trains required to maintain safe operations. Similarly, location updates that are too infrequent must include an uncertainty buffer to account for the distance a train may have moved between updates. This adds to the train spacing requirements, further constricting system capacity.

In order to remove these constrains on system capacity by minimizing or eliminating these uncertainties in train location, a means of rapidly determining train location with greatly improved accuracy and precision is needed. Ultra-wideband (UWB) wireless range measurement systems provide the basis of such a system. While UWB systems are capable of rapid and accurate determination of the distance between two installations, this information alone does not complete the process of determining a train's location within a defined railway network. Application of UWB technology to this problem requires a system of UWB installations at well-defined reference locations, using wayside units ("anchors"), and a means to reliably translate measured distances from anchors into a location meaningful within the railway network reference frame.

While the track geometry of a railway network may be very well defined in construction and survey documents, using details of that known geometry to determine location is not a straightforward task—and generally railway network documentation on track geometry, particularly for older systems or sections of track, may not be accurate, and may not have been kept up to date with track modifications. Geometric calculations applicable to curved (e.g., fixed-radius) sections of track differ from those useful on straight track, and calculations for spiral (e.g., varying-radius curves) differ from both of these. Since knowing which set of calculations to use requires knowing where you are, there is a somewhat circular problem of having to know your location in order to correctly determine your location.

An iterative approach of increasingly finer determinations might be possible, but this would require lengthy—and variable—processing time. In addition, compensation for factors like the offset of anchors from the track centerline on curved and spiral sections of track entail involved trigonometric calculations, requiring more processing time. The time these calculations consume would cause delays that reduce the frequency of location updates, possibly limiting the timeliness of location determination to the point where an additional train-location uncertainty envelope is needed, defeating the purpose of the UWB system.

To achieve the increased accuracy and precision that may be possible with use of UWB technology, and thus the associated increase in transit system capacity, various implementations in accordance with the present disclosure provide means of translating point-to-point distance measurements between trains and fixed anchors into transit system locations with sufficient accuracy, precision, and speed that location uncertainty due to sensing and timing limitations is dramatically reduced.

Further, the ranging utilized in various implementations in accordance with the present disclosure may be performed based on simple calculations applicable to all track geometries, and a track map dataset that establishes the distance between anchors and "range points" along all tracks. Range points are not physical installations, rather they are specific points along a track defined by the ranges from all nearby anchors to the range point. Range points are chosen such that a linear function approximating the length of track between them can be defined that is sufficiently accurate to ensure the required location accuracy. Between two range points, the linear function connecting them is used to convert range measurements into location.

FIG. 1 illustrates ranging to an anchor by a train traversing a track. Shown in FIG. 1 is a train 110 traversing a path (track) with an anchor A 120 deployed in proximity to the track.

Each of the train 110 and the anchor A 120 comprises suitable circuitry (as well as any required hardware components—e.g., sensory, communicative, etc.) for implementing all aspects of the disclosure as described herein. For example, the train 110 may incorporate a carborne unit (or train-mounted unit) that may be configured to communicate with the anchor A 120, particularly using ultra-wideband (UWB) signals, and to perform various functions based on such communications. In particular, the carborne unit may be configured for performing ranging based calculations based on the UWB signals. In this regard, the UWB signals may be particular suitable for use in such ranging operations, as described herein. In this regard, the carborne unit may be implemented as a single device including or housing all required components for performing functions associated therewith. The disclosure is not so limited, however. Thus, in some implementations, the carborne unit may comprise one or more dedicated components configured for deployment external to the main housing (e.g., antenna unit configured for deployment on the roof, with the main housing deployed within the train). In some instances, the carborne unit may be implemented as an arrangement with multiple sub-units, for facilitating communications in multiple directions, including in front and behind the train.

For example, the carborne unit may be configured to determine location relative to anchors (e.g., the anchor A 120) based on ranging to the anchors. In this regard, location may be determined as a function of range:

$$L=f(R)$$

Where L is linear distance from the train 110 to the projected position of the anchor onto the straight line of movement of the train, and R is the direct (straight line) distance from the train to the anchor, as illustrated in FIG. 1.

Where location may be determined readily, however, it may be determined or estimated instead based on measured changes—e.g., since L changed as R changed, measured changes in R may be used in determining changes in L. For example, knowing the distance (F) from the anchor to the straight line of movement of the train, the location of the train at the left, relative to the anchor may be calculated as:

$$L=\sqrt{R^2-F^2}$$

Changes in L may be determined by calculating derivative of L with respect to R (dL/dR). As there are nested functions acting on R, this parameters may be defined using the two functions:

$$g(R)=R^2-F^2$$

$$f(R) = \sqrt{g(R)} = (g(R))^{\frac{1}{2}}$$

Using the chain rule:

$$\frac{d}{dx}(f(g(x)) = f'(g)(x)) \cdot g'(x)$$

$$\frac{dL}{dR} = \frac{1}{2} \cdot (R^2 - F^2)^{\frac{-1}{2}} \cdot 2R$$

$$\frac{dL}{dR} = \frac{R}{\sqrt{R^2 - F^2}} = \frac{R}{L} = \frac{1}{\cos \alpha}$$

Thus by measuring a small change in range $\Delta R$, the change in location $\Delta L$ may be determined by:

$$\Delta L = \Delta R \cdot \frac{dL}{dR}$$

By expanding $\Delta L$ and $\Delta R$ and rearranging gives:

$$(L - L0) = (R - R0) \cdot \frac{dL}{dR}$$

$$L = L0 + (R - R0) \cdot \frac{dL}{dR}$$

Thus, the ranging functions implemented in the train may be configured to determine location based on ranging to nearby anchor using such calculations, which may be done quickly and without undue complexity compared to existing solutions. A use scenario where such ranging is performed while the train is moving on the track, particularly where the track is not straight is described with respect to FIG. 2.

Figure 2:
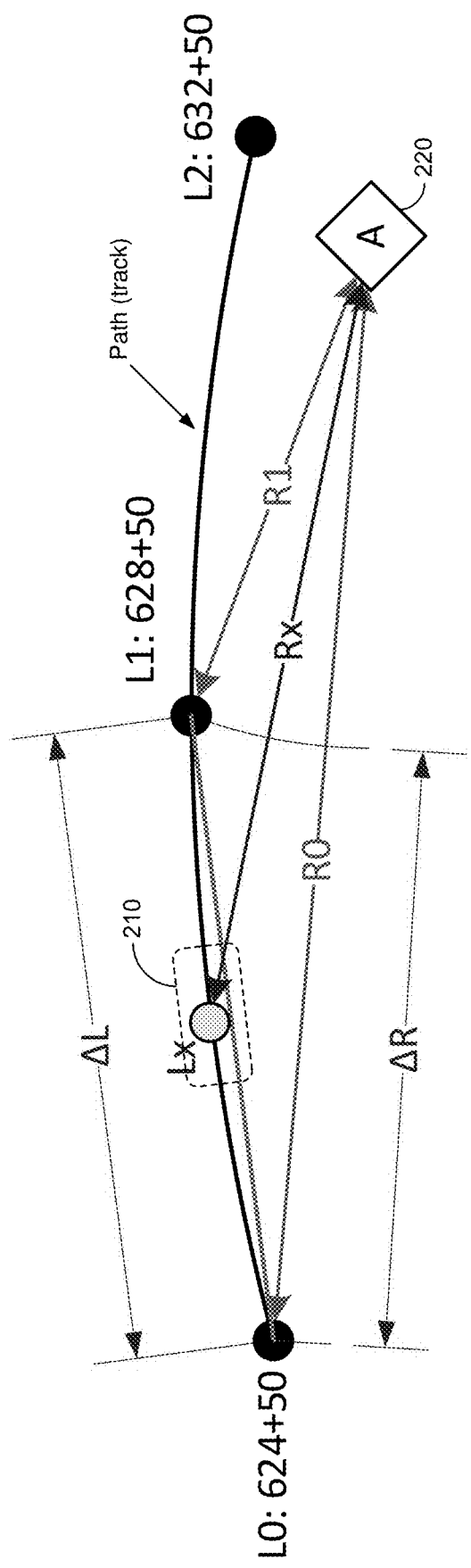
FIG. 2 illustrates navigation of a train based on ranging to anchors.

FIG. 2 illustrates navigation of a train based on ranging to anchors. Illustrated in FIG. 2 is a process in accordance with the present disclosure for determining location (Lx) of a train 210 traversing a path based on the measured range (Rx).

The calculation relies on entries in a track map dataset (e.g., as described below) that defines range points "L0", at known location (e.g., 624+50) and range R0 from an anchor 220 (referred to anchor "A"), and "L1", at location 628+50, and range R1 from anchor A 220. The determination of Lx is made by the calculation:

$$Lx = L0 + (Rx - R0) \cdot \frac{\Delta L}{\Delta R}$$

Where:

$$\frac{\Delta L}{\Delta R} = \frac{L1 - L0}{R1 - R0}$$

The reliance on the calculation of $\Delta L/\Delta R$, which is an approximation of the derivative of the function relating location to range, as explained above, and which is commonly written dL/dR, gives rise to referring to the technique as "dLdR."

In some instances, dLdR based location determinations may be used in determining other parameters associated with operation of the train. For example, in some implementation, location of train (and changes therein vs. time) may be used in determining speed of train. For example, determination of speed is accomplished by comparing successive locations relative to the time between their determination:

$$\text{speed} = \frac{L_N - L_{N-1}}{t_N - t_{N-1}}$$

Where $L_N$ is the most recent location, $L_{N-1}$ is the previous location, $t_N$ is the time of the most recent location, and $t_{N-1}$ is the time of the previous location.

To support use of the dLdR technique, each track may be described as a series of range points, with each ranging point having corresponding information to facilitate use of dLdR technique based operation based on ranging to nearby anchor(s). For example, the defined range points may have corresponding entries in a data structure (e.g., a track map dataset) that associate each location with the ranges from that location to all anchors in the vicinity (e.g., all anchors that are within communication range of each range point). The accuracy of locations thus calculated between range points is governed by the orientation of the segment connecting two range points relative to the anchor, and the distance between the range points. This allows the approach to handle arbitrary track geometry by controlling the location and spacing of range points and the location of anchors to maintain required accuracy.

In addition to providing improved location accuracy for any track geometry without requiring complex calculations, the dLdR technique provides other advantages over location determination methods currently in use. These are described in the following paragraphs, and include a) reduced density of wayside installations (e.g., balises), b) accommodation of location/track length anomalies or discontinuities, c) support for location error correction on a per-segment basis, d) relies only on basic track and anchor measurements (e.g., without need for precision surveying of the railway network), d) static determination of location, e) static determination of location and/or track occupancy, f) moving determination of location and/or track occupancy, g) greater spacing between wayside installations with increased location resolution, h) accommodation of location divergence between ostensibly parallel tracks, i) anchor displacement detection, and j) error reduction.

Performing location calculations using an idealized geometric description of the track, as might be found on construction or survey documents, may require characterization of the track to a degree that is difficult to achieve (i.e. locate the point of transition between a spiral and a curve). In addition, to know which set of calculations to use (e.g. intersection of a circle and a line vs. intersection of two circles), a system would have to know what section of track it occupied, i.e. it would have to know where it is to be able to determine where it is. This makes the process iterative, adding complexity and processing time. In contrast, the dLdR technique relies only on simple calculations which are consistent regardless of track shape and anchor locations, and a track map containing data that can be easily acquired during a survey of the anchor-equipped track.

Flexibility in location of anchors (physical installations) and especially range points (virtual points) along the track can keep the location error over any segment arbitrarily low. The cost of reduced error is only increased track map size. The approach to equipping regions of track where precise locations are especially important (e.g. at a platform) is to install a sufficient number of anchors at conducive locations, and to define range points such that the required location accuracy is achieved.

The improved accuracy and increased reporting rate afforded by this technique allows a reduction in the uncertainty in the reported position of the train. This allows more precise train position determination, as well as allows increased system capacity by decreasing the required spacing between trains.

In some instances, dLdR technique (and data obtained based thereon) may be used in support of other train related solutions. For example, in some implementations, dLdR technique (and data obtained based thereon) may be used for worker protection purposes, where one or more wayside devices (e.g., fixed or movable, such as tripod-mounted; battery-powered or connected to local power supply) that are equivalents of a train-mounted unit, which may be placed along the track's wayside near a work site (or where work party is located). Such unit may be configured to determine its location using the dLdR technique and report, preferably wirelessly, its location using a data communication network, either UWB or otherwise.

Figure 3:
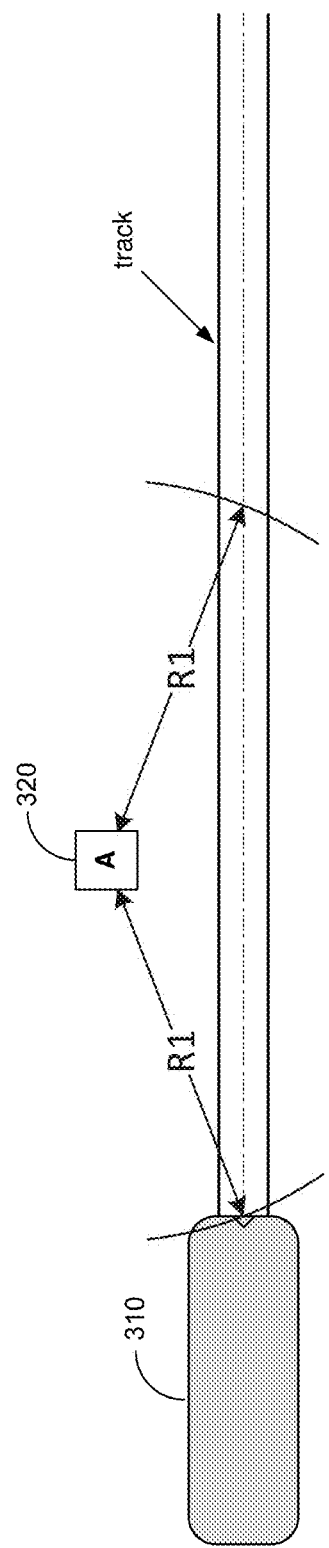
FIG. 3 illustrates determining location based on a single range result.

FIG. 3 illustrates determining location based on a single range result. Shown in FIG. 3 is a train 310 traversing a track, with an anchor A 320 deployed next to the track.

The train may perform location determination based on ranging to the anchor A 320. In this regard, determining location from a single anchor does not result in a unique location because the circle defined by range R1 and centered on the anchor A 320 intersects the track in two locations.

Figure 4:
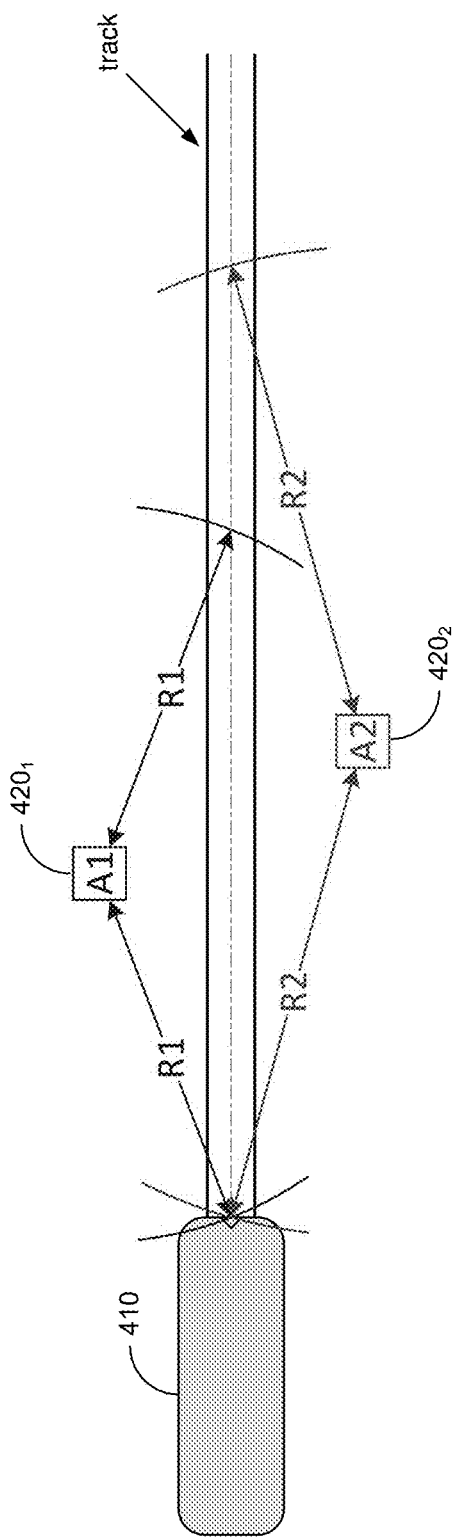
FIG. 4 illustrates determining location based on ranging to multiple anchors.

FIG. 4 illustrates determining location based on ranging to multiple anchors. Shown in FIG. 4 a train 410 traversing a track, and a pair of anchors, anchor A1 $420_1$ and anchor A2 $420_2$ deployed next to the track.

The train 410 may perform location determination based on ranging to both of anchor A1 $420_1$ and anchor A2 $420_2$. In this regard, location determination based on ranging with one anchor (e.g., anchor A1 $420_1$) may result in two different possible locations corresponding to where the range intersects the track. Repeating the location determination using the second anchor (e.g., anchor A2 $420_2$) results in two more possible locations. However, with proper positioning of the two anchors, only one of two possible locations from the first location determination (based on ranging to one anchor) coincides with a location from the second location determination (based on ranging to the other anchor). This confirms the coincident location as the train's actual location. Further reinforcement of the correct location can be accomplished by location determination from additional anchors.

Figure 5:
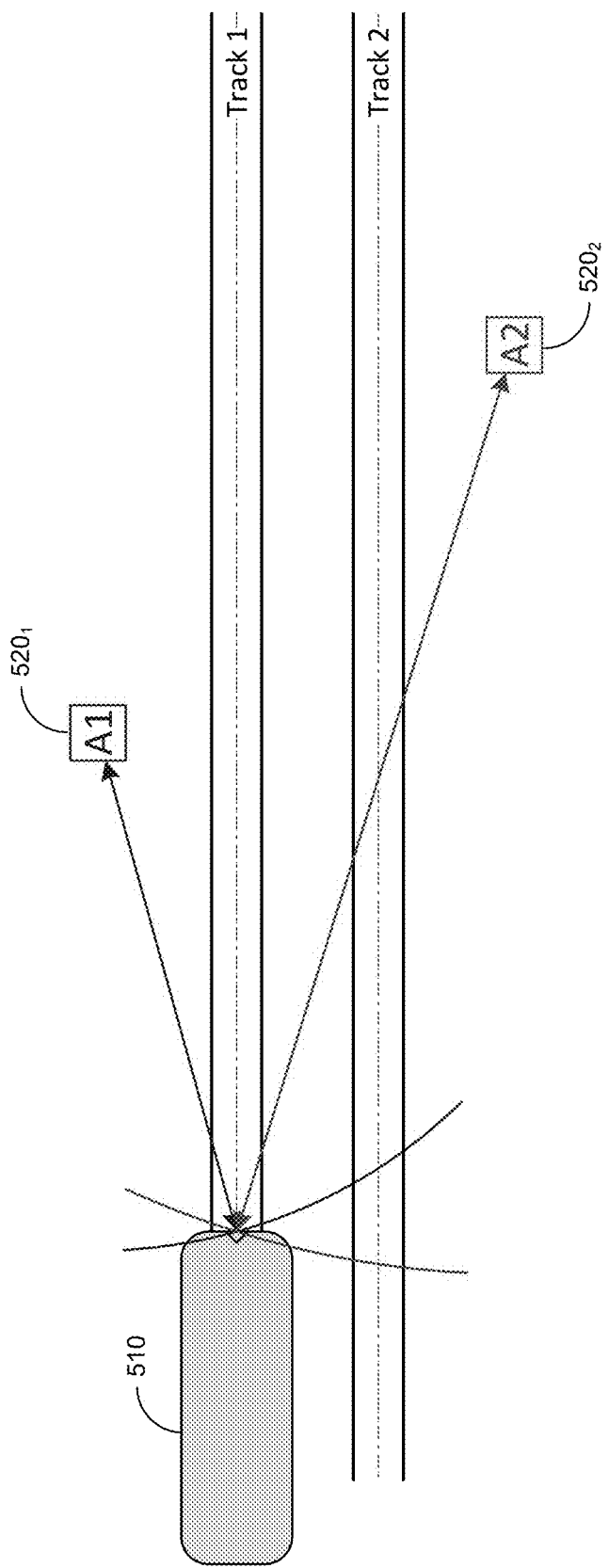
FIG. 5 illustrates static track occupancy determination based on ranging to multiple anchors.

FIG. 5 illustrates static track occupancy determination based on ranging to multiple anchors. Shown in FIG. 5 a train 510 traversing one of two adjacent tracks (track 1 and track 2), and a pair of anchors, anchor A1 5201 and anchor A2 5202 deployed next to the tracks.

The train 510 may perform location determination based on ranging to both of anchor A1 5201 and anchor A2 5202. In this regard, as illustrated in FIG. 5, ranging to anchors may allow for static track occupancy determination—that is, determination of track occupancy within track area where anchors are deployed while the train is static (not moving). Because the ranging techniques described in this disclosure allow a train to determine its location relative to multiple anchors statically, this may enable determining location of train with respect to track—that is, which track among a number of adjacent tracks the train occupies, and to do so statically (before the train ever moves). This may be done, for example, by determining location from multiple anchors based on map data for all tracks in the vicinity. For example, in the use scenario illustrated in FIG. 5, locations determined from multiple anchors on the occupied track (Track 1) will coincide (the range measurement circles cross), while locations on other tracks (e.g., Track 2) will diverge (the range measurement circles cross the track at different points). As with static localization, the conclusion can be reinforced by locations using additional anchors.

Figure 6:
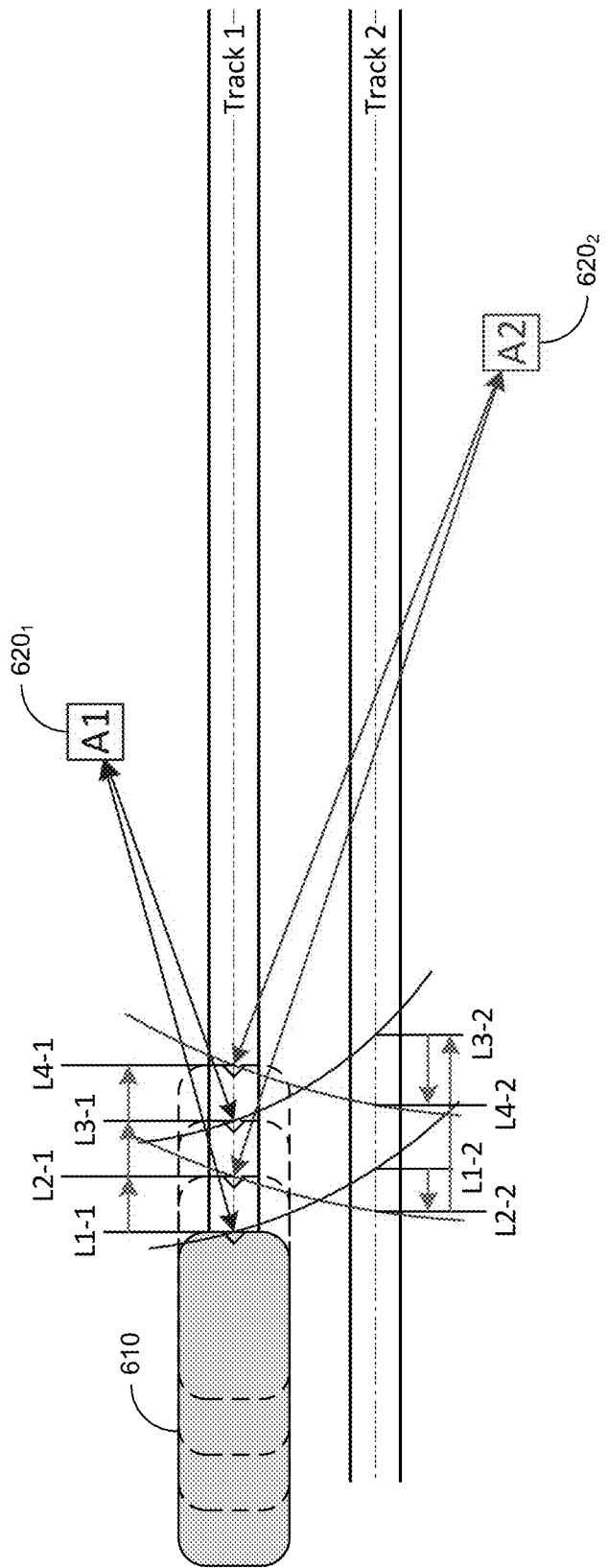
FIG. 6 illustrates dynamic track occupancy determination based on ranging to multiple anchors.

FIG. 6 illustrates dynamic track occupancy determination based on ranging to multiple anchors. Shown in FIG. 6 a train 610 traversing one of two adjacent tracks (track 1 and track 2), and a pair of anchors, anchor A1 6201 and anchor A2 6202 deployed next to the tracks.

The train 610 may perform location determination based on ranging to both of anchor A1 6201 and anchor A2 6202. In this regard, as illustrated in FIG. 6, ranging to anchors may allow for dynamic track occupancy determination— that is, determination of track occupancy within track area where anchors are deployed while the train is moving (e.g., dynamic determination of track, location and direction before entering equipped territory). For example, in instances where only part of a system is equipped, ranging to anchors in accordance with the present disclosure may support the ability of trains approaching equipped territory to determine their location, direction, speed, and track occupancy before reaching the boundary of equipped territory.

This may be allowed by positioning anchors at or near the boundary and relying on their range to allow approaching trains to contact them and perform the required calculations before reaching the boundary. For example, such dynamic determination may be accomplished by comparing successive locations determined based on each track in the vicinity, as illustrated in FIG. 6. In this regard, as train 610 moves (e.g., from left to right), a sequence of location determinations (e.g., four as shown in FIG. 6) on each of the two tracks, from each of two anchors, alternately. The first range data from anchor 1 results in two possible locations: L1-1 (first location on track 1) and L1-2 (first location on track 2). The next range from anchor 2 results in locations L2-1 and L2-2. One more range from each anchor results in the $3^{rd}$ and $4^{th}$ locations on each track.

By calculating the speed implied by the sequences of locations on each track (shown as green arrows in the figure), the system can identify the occupied track. The system accomplishes this by detecting that the sequence of locations on track 1 is consistent with normal inertial motion of a train, while the sequence of locations on track 2 implies erratic changes in direction and large alterations in velocity which would require significant accelerations. This is illustrated more clearly in the example use scenario described with respect to FIGS. 7A-7D, below. This distinction allows the determination that the train is on track 1, at location L4-1, and moving at speed calculated for this sequence of locations.

FIGS. 7A-7D illustrate an example use scenario when using dynamic track occupancy determination based on ranging to multiple anchors. Shown in FIGS. 7A-7D is a sequence for determining track occupancy of a train-particularly, determining which of two tracks (track 1 and track 2) the train occupies based on ranging to two anchors A1 and A2, each deployed in proximity to one of the two tracks (e.g., with anchor A1 deployed in proximity to track 1 and anchor A2 deployed in proximity to track 2).

The train (e.g., using a carborne unit deployed on the train) may be configured to use ultra-wideband (UWB) signals communications with the anchors A1 and A2 to range to one or both of these anchors. In this regard, the carborne unit may continually range to the two anchors while the train is moving, with the ranging being used to determine possible locations of the train based on the ranging (e.g., possible locations on the tracks based on calculated range to each of the anchors).

Figure 7A:
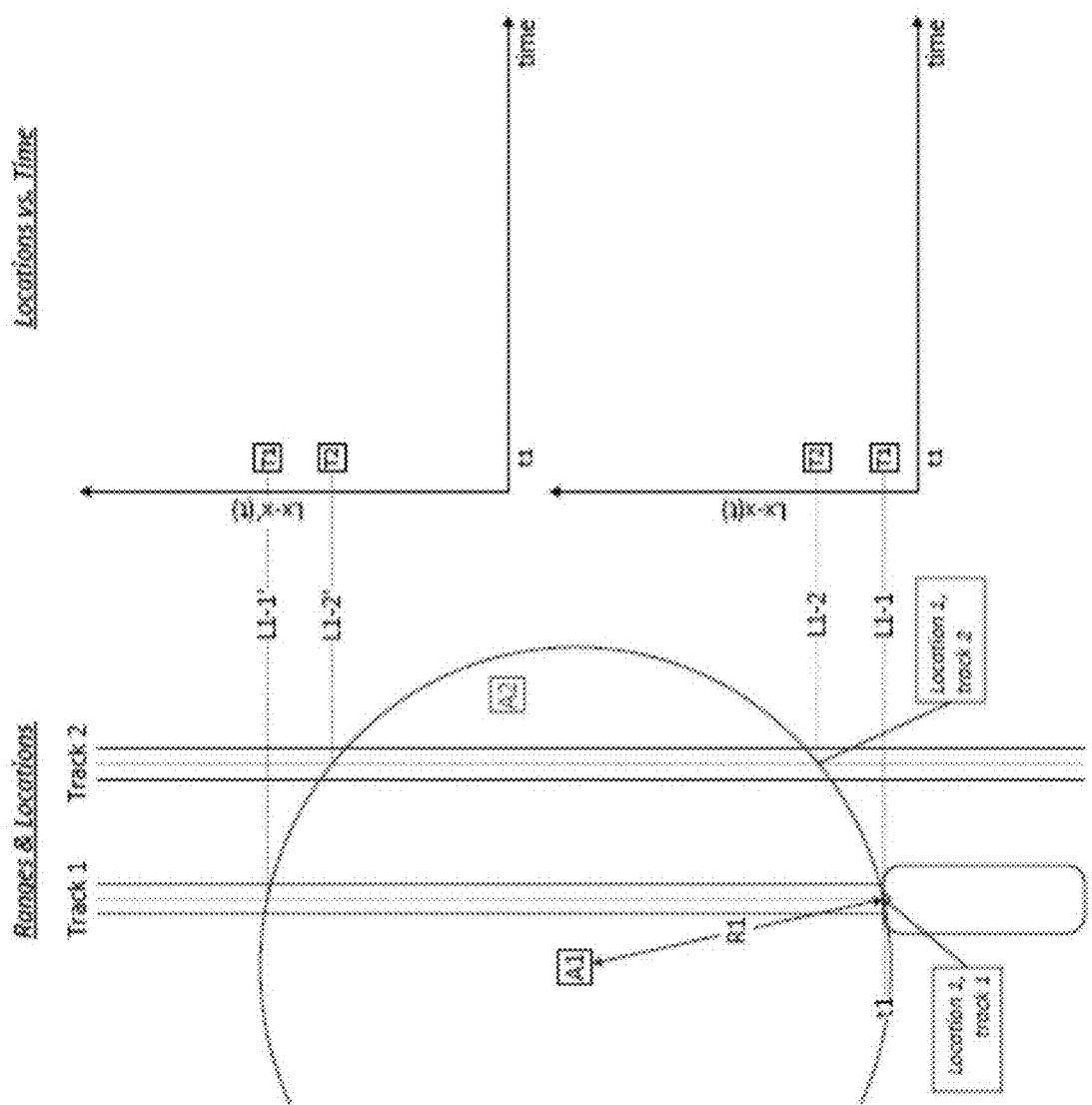
FIGS. 7A-7D illustrate an example use scenario when using dynamic track occupancy determination based on ranging to multiple anchors.
Figure 7B:
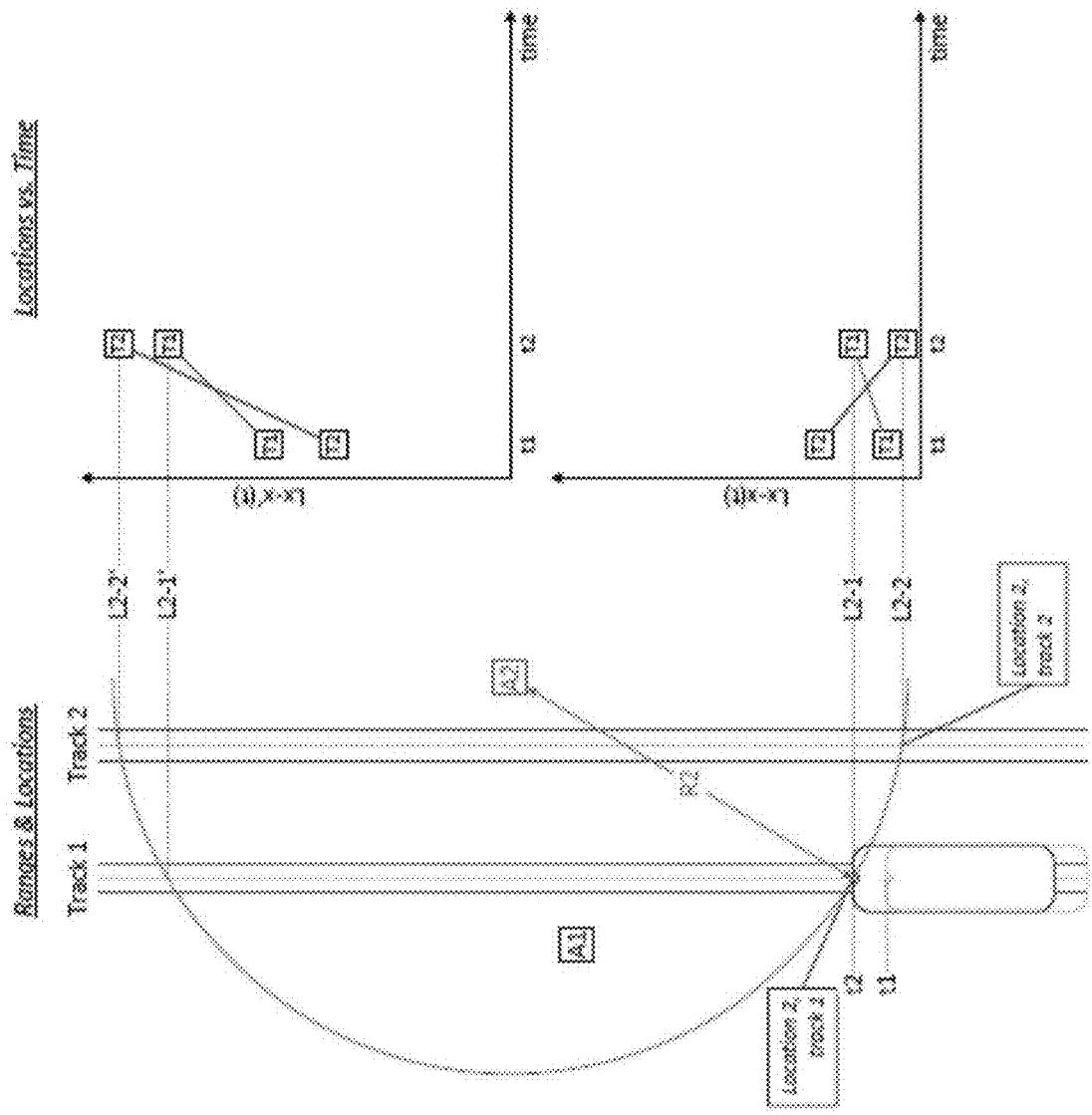
Figure 7C:
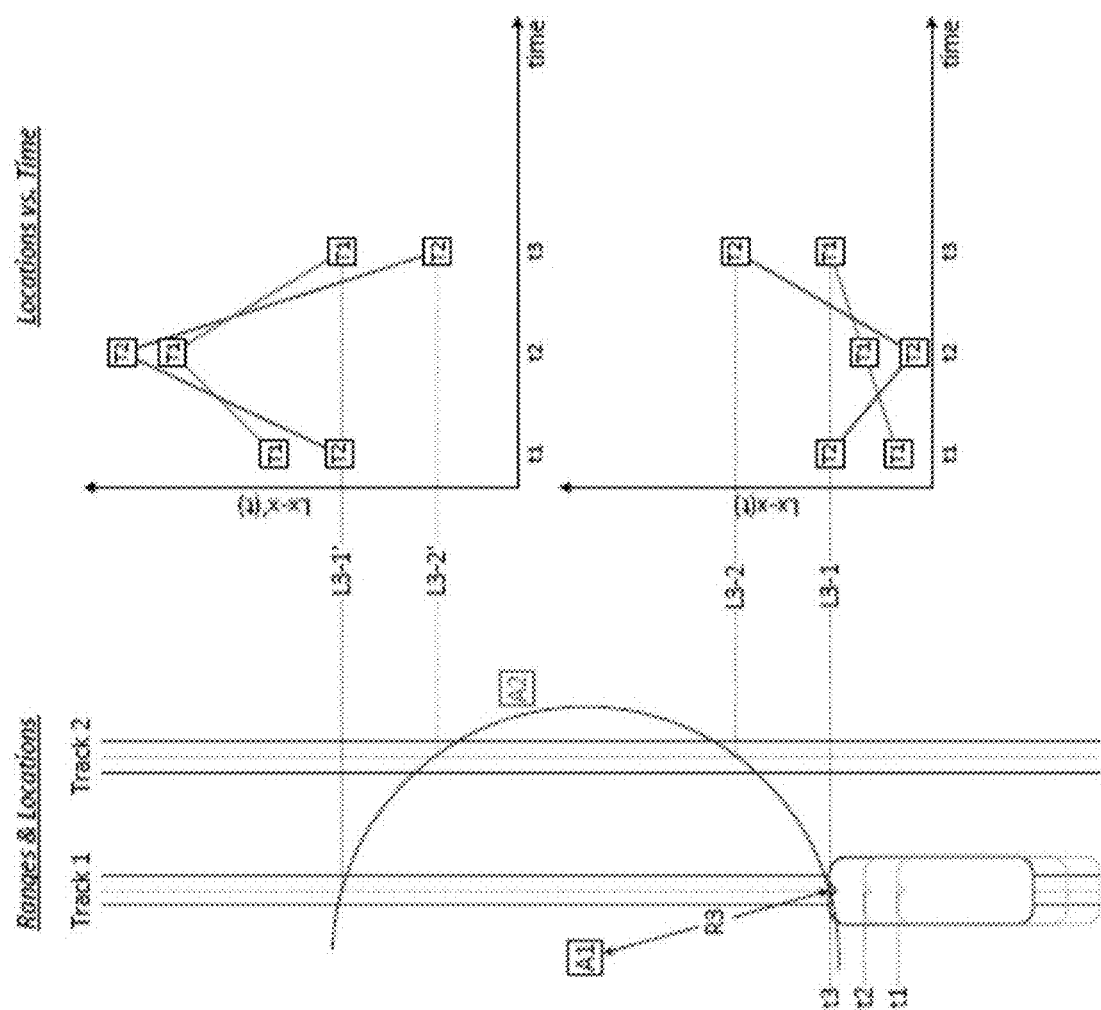
Figure 7D:
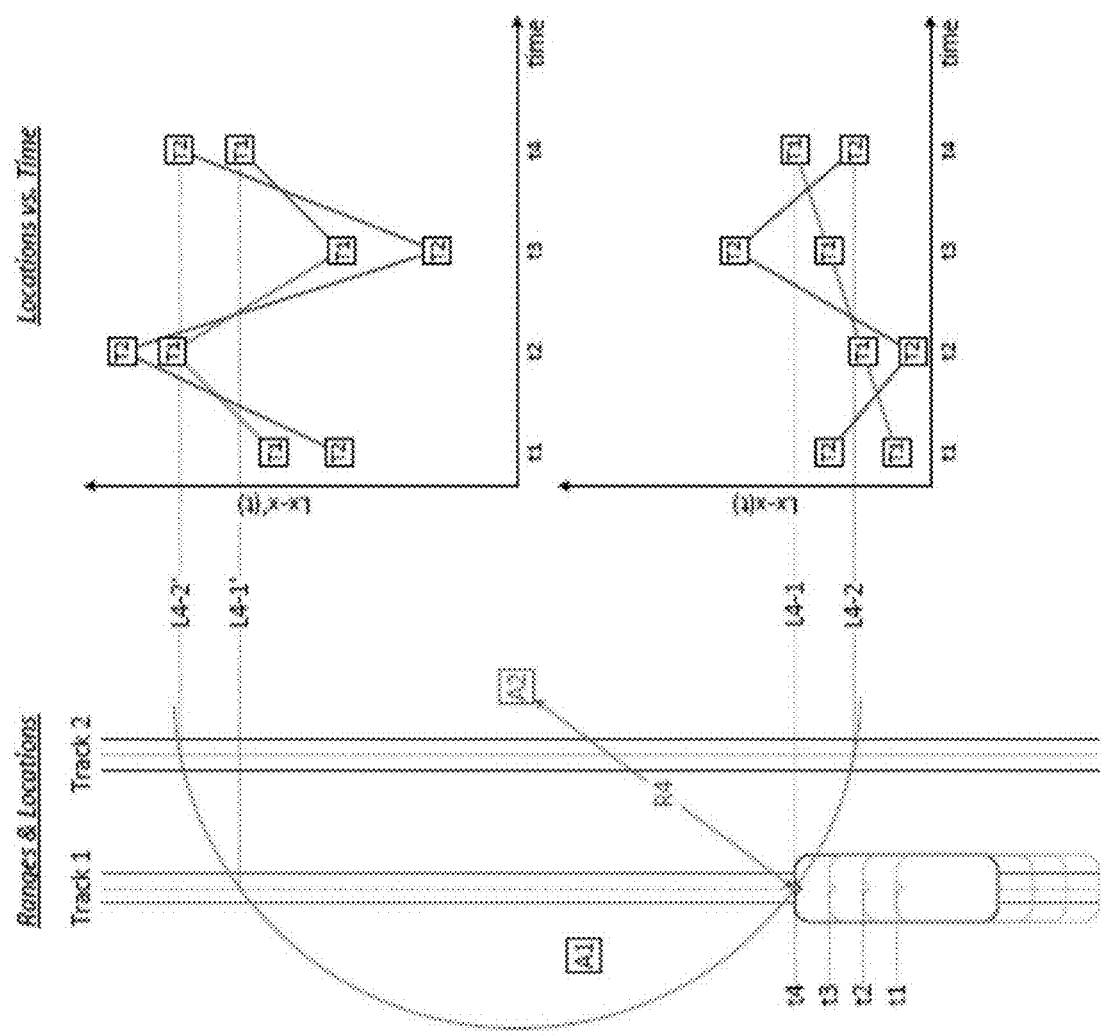

For example, at an initial point in time (t1), an initial range to anchor A1 is performed, as illustrated in FIG. 7A, resulting in determination of four (4) possible locations on the two tracks (L1-1, L1-2, L1-1' and L1-2'). At a second subsequent point in time (t2), an initial range to anchor A2 is performed, as illustrated in FIG. 7B, resulting in determination of four (4) more possible locations on the two tracks (L2-1, L2-2, L2-1' and L2-2'). At a third subsequent point in time (t3), another range to anchor A1 is performed, as illustrated in FIG. 7C, resulting in four (4) more possible locations on the two tracks (L3-1, L3-2, L3-1' and L3-2'). At a fourth subsequent point in time (t4), another range to anchor A2 is performed, as illustrated in FIG. 7D, resulting in four (4) more possible locations on the two tracks (L4-1, L4-2, L4-1' and L4-2').

By continuing to monitor and assess the possible locations on the tracks, the track occupancy may be determined. For example, the carborne unit may monitor changes in location with respect to each of the tracks at different times, as illustrated in the location vs. time charts in FIGS. 7A-7D, which show determined location(s) on each of the two tracks based on ranging to the two anchors at times t1-t4. By assessing the changes (in time) of the determined location of the train on each of the tracks (based on ranging to the anchors), it may be determined which track is occupied. For example, as illustrated in the charts in FIGS. 7A-7D, because determined changes in train's location on track 1 (based on ranging to the anchors) are constant (e.g., linear) while train's location on track 2 (based on ranging to the anchors) are erratic (rising and falling in non-linear manner), this suggests a steady motion on track 1 and in particular direction (based on which of the two possible directions on track 1 corresponds to the steady motion).

The operational range of UWB ranging equipment allows anchors to be spaced much farther apart than other markers used for train location (e.g., balises). The spacing UWB based anchors may be dependent on the configuration of the UWB communications, however. For example, use of impulse UWB signaling with coherent averaging may allow for more optimal spacing (e.g., anchors being spaced farther apart) compared to other types of UWB signaling, particularly without coherent averaging of multiple measurements, which may require spacing of anchors at ⅕ to 1/10 of the distance, thus requiring more anchors (e.g., 5× to 10× number of anchors). Nominal anchor spacing is anticipated to be in the 400-500 ft. range, which will allow trains traversing the area to contact multiple anchors ahead and behind the train. Depending on the installation environment, anchors can provide service to multiple tracks in an area. In contrast, balises for example serve only the track on which they are installed, and must often be placed much more closely (e.g., 50-100 ft.) to provide the required location accuracy, and even then do so only with certain degree of acceptable inaccuracy. These features are described in more detail below.

Locations along a track (e.g., "stations") are typically expressed in feet along the track from a reference location. For example, such stations may be spaced 100 ft. apart. The first station at the beginning of the baseline is 0+00, and the next station located 100 ft. from it is 1+00. A station number of 20+92.05 indicates 2,092.05 ft. (20×100+92.05) from the baseline starting point. Multiple tracks that run generally in parallel typically share stations even though their paths might diverge slightly between physical locations "at the same station" (e.g., around curves where the track radii differ).

The disagreement between the station (e.g., official) distance and the actual track length between two locations on different tracks can require special handling, for example, to bring the actual and official distances back into alignment, and to prevent any resulting erroneous speed indications. The dLdR technique accommodates this need by including information in the track map dataset that describes these discontinuities and allows the train to compensate for distance discontinuities and maintain accurate speed indication.

In this regard, because the dLdR method requires that location be defined as a precise length along each track, the locations between such ostensibly parallel tracks will vary as the length along the tracks diverge. This could lead to locations on different tracks which are "at the same station" being determined and reported as different by this technique. If location reports must comply with existing stations, the disparity between dLdR-determined locations and stations may be corrected, such as by a secondary process which translates the former into the latter, which is essentially a look-up translation from location to station. The data required for this process can be incorporated into the dLdR track map, or can be maintained separately.

When the carborne equipment has concurrent access to at least three anchors at a time, the system is able to detect significant displacement of a single anchor by comparing location results derived from different anchors. An initial case in which location derived from one anchor disagrees with that from two other anchors which agree with each other is strengthened as the train moves on to different sets of anchors including the suspect anchor. After traversing the area, the carborne equipment will have accumulated location data from three sets of anchors including the suspect anchor. In each set, the data from the suspect anchor will disagree with that from the others, indicating that it is displaced.

Flexibility in location of anchors (physical installations) and range points (virtual points) along the track can keep the location error over any segment quite low (e.g., ±1 ft. over 300 ft. of track, though something as ±0.25 meters (~9.8 inches) throughout an entire transit system may be reasonably achievable in some recent implementations). The nominal approach to equipping regions of track where precise locations are especially important would be to install a sufficient number of anchors and to define range points such that the required location accuracy is achieved.

Even in areas where anchor and range point spacing is greater, it is possible to compensate for error in the dLdR location. One beneficial characteristic of this error is that it is zero at every range point and gradually reaches its peak near the midpoint between two range points. This makes it relatively easy to characterize, and therefore easy to correct in the event that the inherent error in the dLdR approximation is still unacceptably high.

Performing location calculations using an idealized geometric description of the track, as might be found on construction or survey documents, may require characterization of the track to a degree that is difficult to achieve (e.g., locate the point of transition between a spiral and a curve). In contrast, the dLdR technique relies only on simple measurements that can be made from existing track documentation (e.g., no surveying required) and are easily verified or corrected in situ.

FIGS. 8A-8D illustrate a section of a track in railway network and use of map datasets for supporting anchor ranging based operations therein. Shown in FIG. 8A (and similarly in FIGS. 8B-8C) is a track (or section thereof) in a railway network (e.g., a mass transit system), with one or more trains 810 moving on the track, and a plurality of anchors 820 deployed near the track.

Figure 8A:
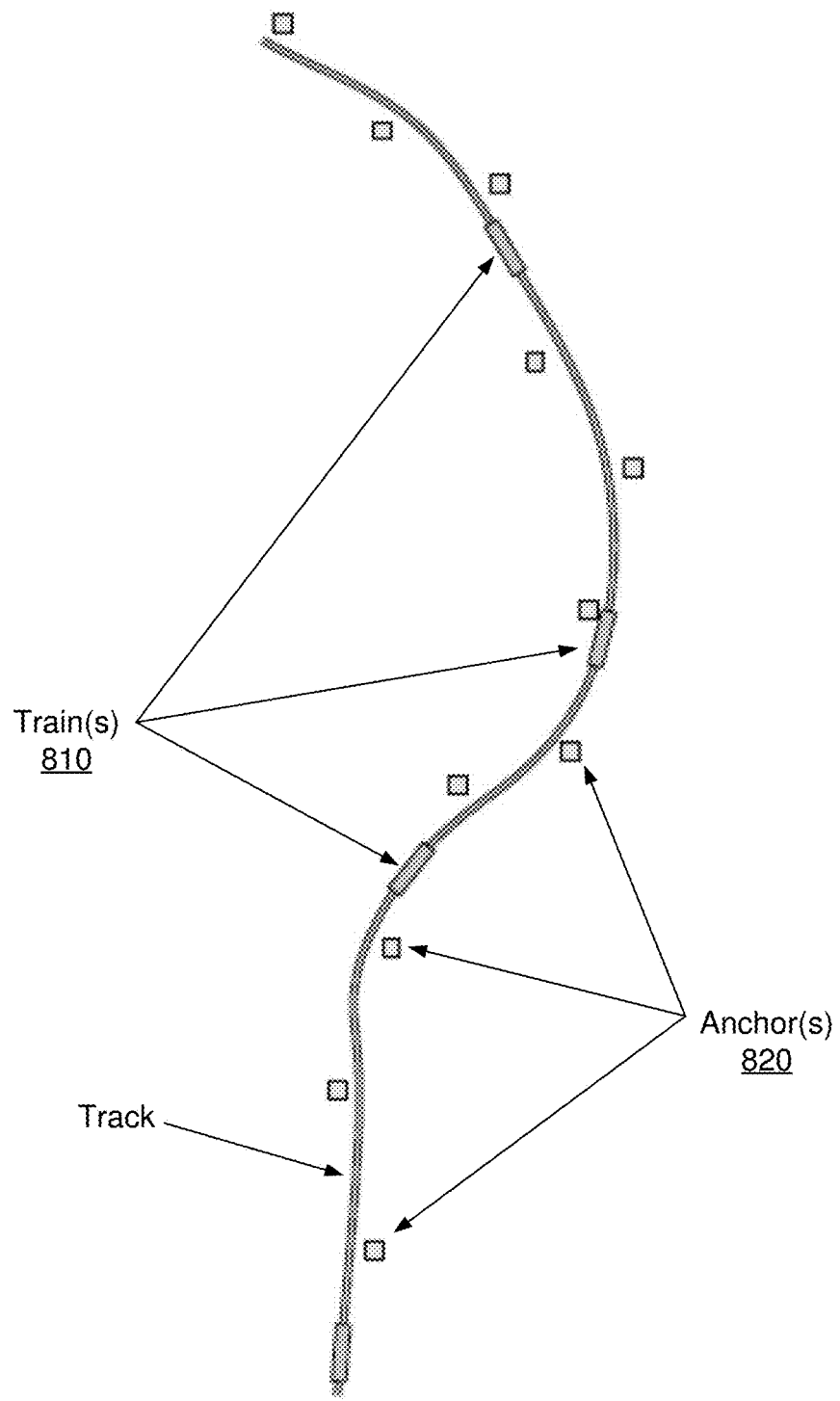
FIGS. 8A-8D illustrate a section of a track in railway network and use of map datasets for supporting anchor ranging based operations therein.
Figure 8B:
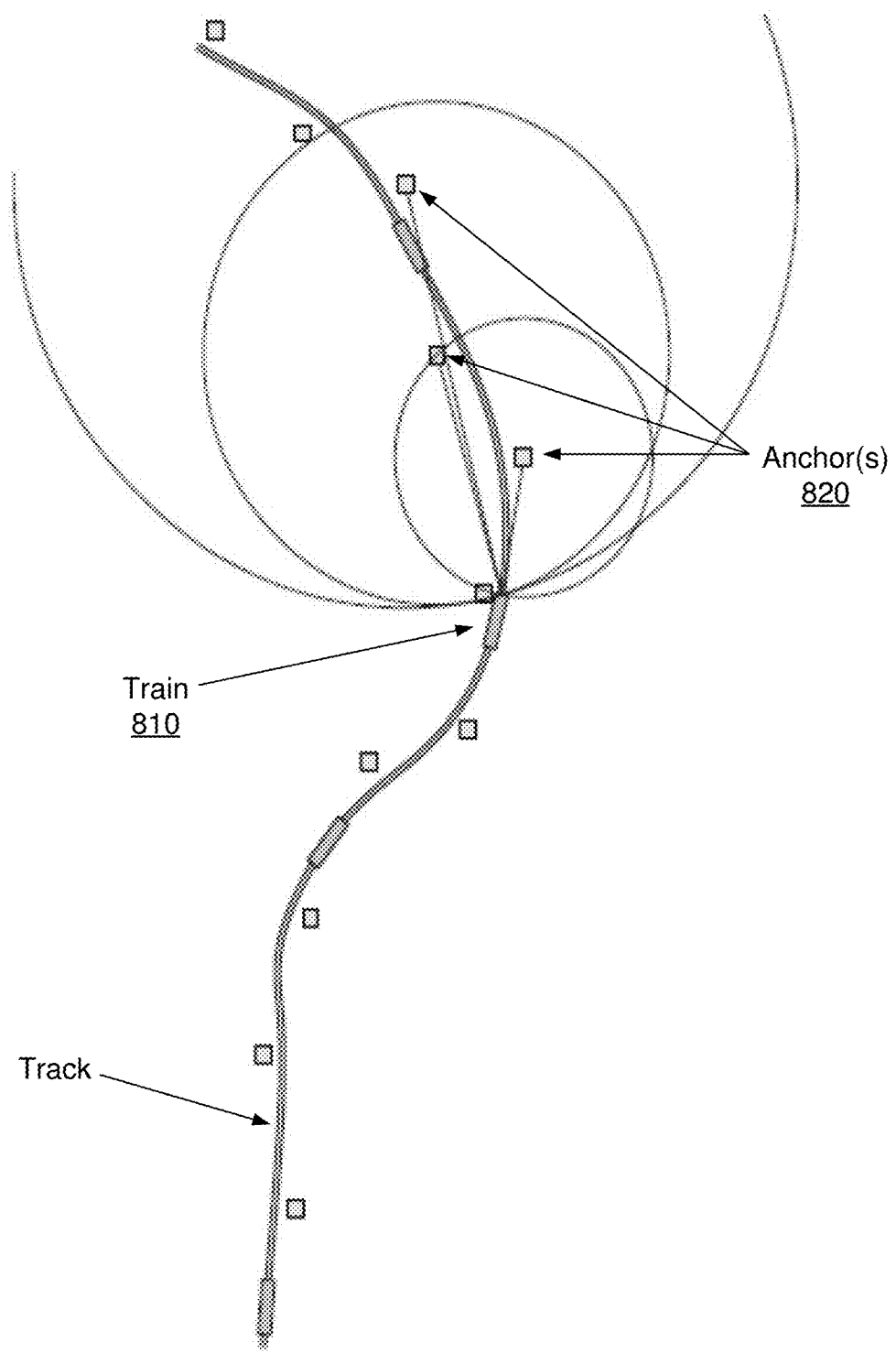

The trains 810 may be configured to range to the anchors 820, as described above. Specifically, as illustrated in FIG. 8B, a train 810 (or a suitable component thereof, such as a carborne unit) may range to anchors that are within communication range of the train (e.g., three anchors as shown in FIG. 8B), particularly using ultra-wideband (UWB) signals, and may use the ranging (or data based thereon) in determining location of the train. The ranging may be used in facilitating determination of location of the train. In this regard, the location of the train may correspond to the intersection of the track and the circle defined by the range. Further, to optimize location determination, ranges from multiple anchors may be collected and used to eliminate false locations.

In some instances, ranging (or data based thereon) may be used in conjunction with additional information to optimize operation of the trains in the railway network. For example, information relating to the anchors and/or track may be used in conjunction with the ranging data to optimize location determination and/or other ranging related function (e.g., track occupancy, etc.). The information may include, for example, positioning information related to the anchors (e.g., coordinates for each of the anchors) and/or information relating to the physical features of the track. Such determination may require use of additional information in conjunction with ranging based measurement, however. For example, information regarding the topology of the track and surrounding area and/or devices deployed nearby (e.g., the anchors) may be used in conjunction with the ranging measurement to determine the location of the train (which in turn may be used to determine other parameters or information relating to operation of the train—e.g., speed).

Figure 8C:
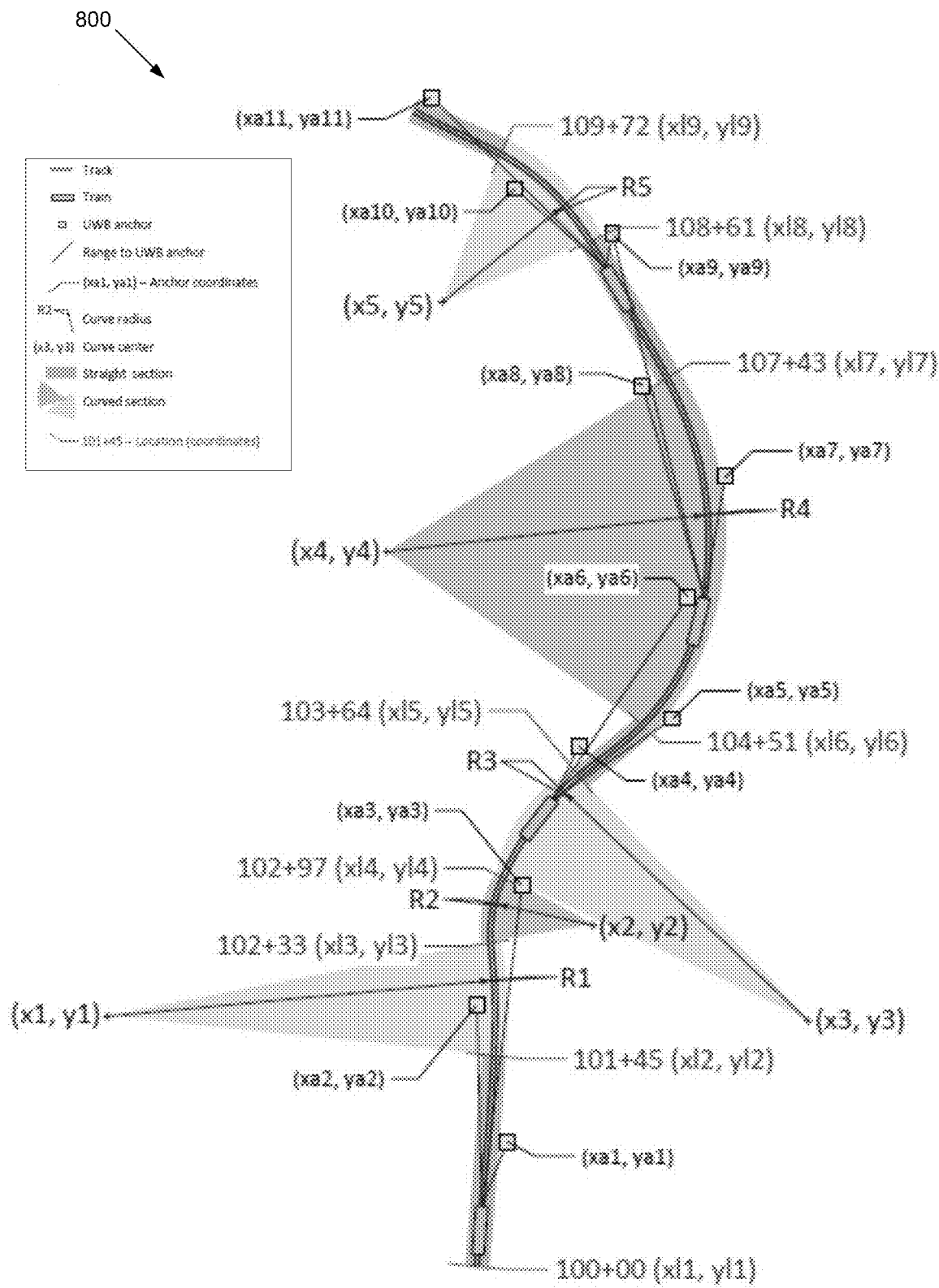

For example, as illustrated in FIG. 8C, a geometry map dataset 800 may be generated for use in supporting ranging based operations. The geometry map dataset 800 may be obtained and stored in the train (or otherwise made available to the train, such as via UWB communications with wayside systems, such as one or more of the anchors). The geometry map dataset 800 may comprise information relating to the anchors and/or the track, which may allow determining the location of the train based on ranging to the anchors. For example, as shown in FIG. 8C, geometry map dataset 800 may comprise coordinates of the anchors, which may be used by the train in conjunction with ranging based data—e.g., to enable obtaining positioning information from the combination of the ranging data and the anchors' coordinates. The geometry map dataset 800 may also comprise track related information. For example, the track related information may identify sections in the track (within particular area—e.g., starting at particular coordinates) that are curved and sections that are straight. The track related information further comprise additional information for each of these sections—e.g., for straight sections, the length of each section; for curved sections, the radii of the curves, centers (e.g., coordinates thereof) of the curves.

Such track related information (e.g., knowledge of which sections are curved and which are straight, and details related thereto) may also be used in location related determinations (or other functions) based on ranging to the anchors. For example, for straight sections the train location may be the intersection of a line and a circle; for curved sections, the train location may be the intersection of two circles. Thus, by knowing the coordinates of the locations that bound the sections of track and the section of track the train is on, the location determination (e.g., the mathematical calculation as described above) may be fine-tuned to determine the train location more accurately.

Generating such geometry map dataset may be complex and cumbersome, however, and the dataset may be too complex and hard to use. Accordingly, a simpler map dataset may be desirable. Use of such simpler map dataset may be particularly possible when using dLdR technique, as location determination may be achieved without requiring as much information about the track topology and nearby devices as what is included in such geometry map datasets. For example, map datasets configured for use in conjunction with use of dLdR technique may merely require inclusion of information about a number of points on the track ("ranging points") with minimal information defined for each of these points, specifically configured for supporting use of dLdR based operations. The per-point information may comprise, for example, a location information for the point (e.g., on the track) and ranging information associated with (e.g., range to) one or more nearby anchors, preferably in both directions of movement on the track.

Figure 8D:
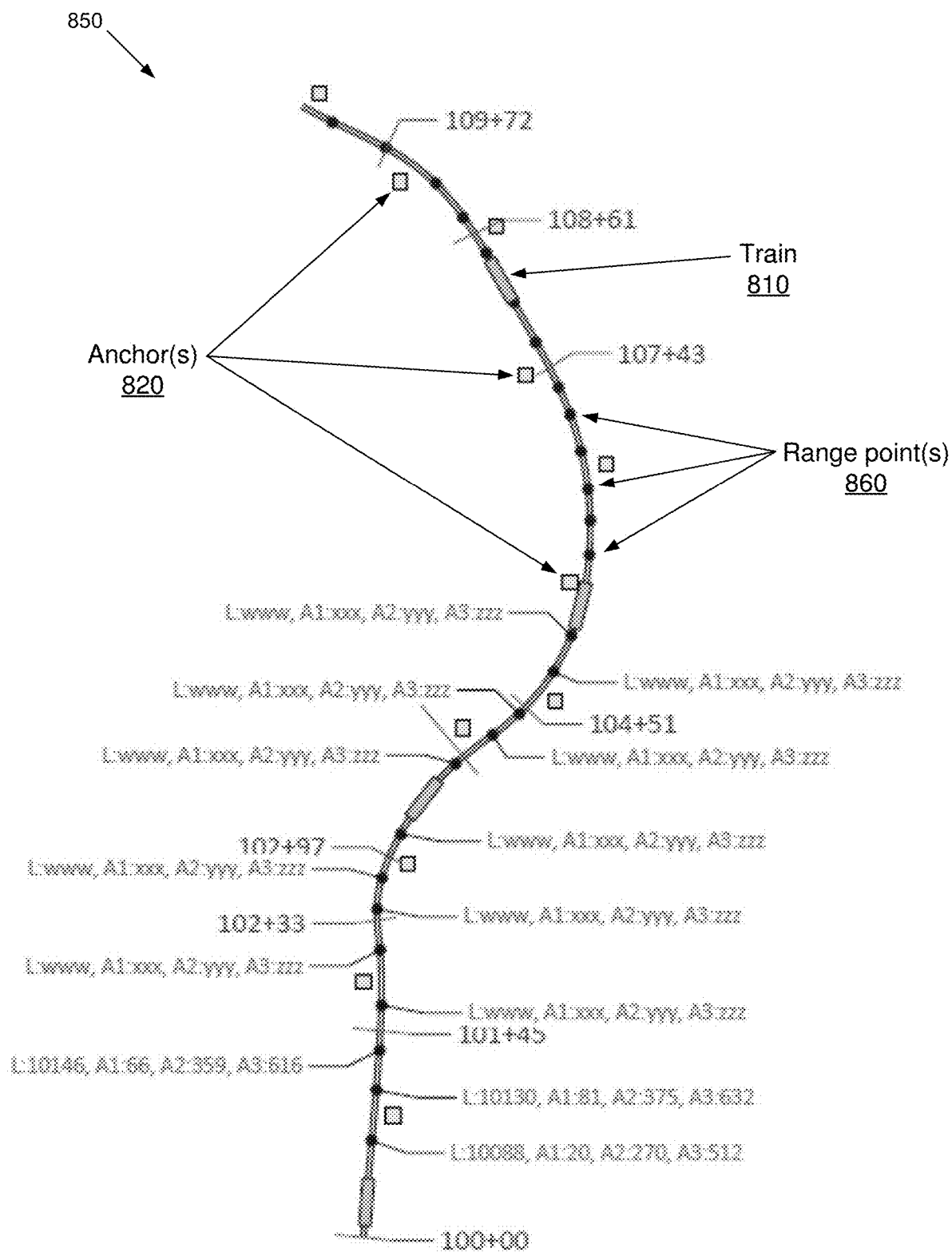

For example, as illustrated in FIG. 8D, a dLdR map dataset 850 may be used to support ranging related functions. In this regard, the dLdR map dataset 850 may comprise information (e.g., structured as a table or list of entries) for a plurality of ranging points on the track, and associated information (location of each ranging point and ranges to nearby anchors). For example, anchors both above and below each range point location may be included, so that each range point location may be usable in both directions of motion on the track. The dLdR map dataset 850 may be generated in the train (e.g., by the carborne unit deployed therein) and stored therein. Alternatively, the dLdR map dataset 850 may be predefined, and then obtained and stored in the train (or otherwise made available to the train, such as via UWB communications with wayside systems, such as one or more of the anchors). Further, in some instances, the dLdR map dataset 850 maintained in the train, may be provided to other trains and/or to other entities (e.g., a central server) in the network, such as via UWB communications with wayside systems, such as one or more of the anchors.

An example system for navigation of trains on arbitrary paths based on reference markers, in accordance with the present disclosure, comprises a plurality of wayside units, each configured for placement on or near tracks in a railway network; and one or more train-mounted units, each configured for deployment on one of one or more trains operating in the railway network; wherein at least one train-mounted unit is configured to, when deployed on a train communicate with any wayside unit that comes within communication range of the at least one train-mounted unit, wherein the communicating comprises use of ultra-wideband (UWB) signals; and generate based on communication, train location information, wherein generating the train location information comprises determining based on processing of communicated UWB signals with at least one wayside unit, range to the at least one wayside unit; and determining based on the determined range to the at least one wayside unit, changes in range ($\Delta R$) to the at least one wayside unit and changes in location ($\Delta L$) on a track in the railway network.

In an example implementation, the at least one train-mounted unit is configured to determine a current location of the train on the track in the railway network based on the determined changes in location (ΔL) and one or more locations on the track.

In an example implementation, the at least one train-mounted unit is configured to determine at least one of the one or more locations on the track based on track related dataset.

In an example implementation, the track related dataset comprises information identifying a plurality of ranging points on the track, and the at least one train-mounted unit is configured to determine the at least one of the one or more locations on the track based on at least one of the plurality of ranging points.

In an example implementation, the track related dataset comprises information associated with each of the plurality of predefined ranging points, the information identifying one or more of the plurality of wayside units, and the at least one train-mounted unit is configured to identify the at least one of the plurality of ranging points based on matching the at least one wayside unit with one of one or more of the plurality of wayside units identified in information in the track related dataset associated with the at least one of the plurality of ranging points.

In an example implementation, the track related dataset comprises information associated with each ranging point of the plurality of predefined ranging points, the information comprising location corresponding to the ranging point, and the at least one train-mounted unit is configured to set the at least one of the one or more locations to location in information in the track related dataset associated with the at least one of the plurality of ranging points.

In an example implementation, the at least one train-mounted unit is configured to identify a track in the railway network the train is occupying based on the generating of the train location information.

In an example implementation, the at least one train-mounted unit is configured to, when identifying the track in the railway network the train is occupying range to one or more wayside units of the plurality of wayside units; and determine the track in the railway network based on assessing ranging related information corresponding to the one or more wayside units.

In an example implementation, one or more wayside units are deployed near one of at least two different tracks, and the at least one train-mounted unit is configured to determine the track in the railway network based on selecting one of the at least two different tracks.

In an example implementation, the at least one train-mounted unit is configured to determine one or more possible locations on each of the at least two different tracks based on ranging to the one or more wayside units; and select the one of the at least two different tracks based on assessing the one or more possible locations.

In an example implementation, the at least one train-mounted unit is configured to control operation of the train based on the generating of the train location information.

In an example implementation, the at least one train-mounted unit is configured to determine one or more train operation parameters based on the generating of the train location information, wherein the one or more train operation parameters comprise at least one of speed and direction of movement.

An example system for navigation of trains on arbitrary paths based on reference markers, in accordance with the present disclosure, comprises a train-mounted device that comprise an ultra-wideband (UWB) based transmitter, configured for transmitting UWB signals; an ultra-wideband (UWB) based receiver, configured for receiving UWB signals; and one or more processing circuits wherein the train-mounted device is configured to, when deployed on a train communicate with any wayside unit, from a plurality of wayside units configured for placement on or near tracks in a railway network, that comes within communication range of the train-mounted device, wherein the communicating comprises use of ultra-wideband (UWB) signals; and generate based on communication, train location information, wherein generating the train location information comprises determining based on processing of communicated UWB signals with at least one wayside unit, range to the at least one wayside unit; and determining based on the determined range to the at least one wayside unit, changes in range (ΔR) to the at least one wayside unit and changes in location (ΔL) on a track in the railway network.

In an example implementation, the train-mounted device is configured to determine a current location of the train on the track in the railway network based on the determined changes in location (ΔL) and one or more locations on the track.

In an example implementation, the train-mounted device is configured to determine at least one of the one or more locations on the track based on track related dataset.

In an example implementation, the track related dataset comprises information identifying a plurality of ranging points on the track, and the train-mounted device is configured to determine the at least one of the one or more locations on the track based on at least one of the plurality of ranging points.

In an example implementation, the track related dataset comprises information associated with each of the plurality of predefined ranging points, the information identifying one or more of the plurality of wayside units, and the train-mounted device is configured to identify the at least one of the plurality of ranging points based on matching the at least one wayside unit with one of one or more of the plurality of wayside units identified in information in the track related dataset associated with the at least one of the plurality of ranging points.

In an example implementation, the track related dataset comprises information associated with each ranging point of the plurality of predefined ranging points, the information comprising location corresponding to the ranging point, and the train-mounted device is configured to set the at least one of the one or more locations to location in information in the track related dataset associated with the at least one of the plurality of ranging points.

In an example implementation, the train-mounted device is configured to identify a track in the railway network the train is occupying based on the generating of the train location information.

In an example implementation, the train-mounted device is configured to, when identifying the track in the railway network the train is occupying range to one or more wayside units of the plurality of wayside units; and determine the track in the railway network based on assessing ranging related information corresponding to the one or more wayside units.

In an example implementation, one or more wayside units are deployed near one of at least two different tracks, and the train-mounted device is configured to determine the track in the railway network based on selecting one of the at least two different tracks.

In an example implementation, the train-mounted device is configured to determine one or more possible locations on each of the at least two different tracks based on ranging to the one or more wayside units; and select the one of the at least two different tracks based on assessing the one or more possible locations.

In an example implementation, the train-mounted device is configured to control operation of the train based on the generating of the train location information.

In an example implementation, the train-mounted device is configured to determine one or more train operation parameters based on the generating of the train location information, wherein the one or more train operation parameters comprise at least one of speed and direction of movement.

Aspects of the techniques described herein may be implemented in digital electronic circuitry, computer software, firmware, or hardware, including the structures disclosed herein and their structural equivalents, or in various combinations. Aspects of the techniques described herein may be implemented using a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Each of the computer programs may have, for example, one or more sets of program instructions residing on or encoded in the non-transitory computer-readable storage medium for execution by, or to control the operation of, one or more processors of the machine or the computer. Alternatively or in addition, the instructions may be encoded on an artificially-generated propagated signal, for example, a machine-generated electrical, optical, or electromagnetic signal that may be generated to encode information for transmission to a suitable receiver apparatus for execution by one or more processors.

A non-transitory computer-readable medium may be, or be included in, a non-transitory computer-readable storage device, a non-transitory computer-readable storage substrate, a random or serial access memory array or device, various combinations thereof. Moreover, while a non-transitory computer-readable medium may or may not be a propagated signal, a non-transitory computer-readable medium may be a source or destination of program instructions encoded in an artificially-generated propagated signal. The non-transitory computer-readable medium may also be, or be included in, one or more separate physical components or media (for example, CDs, disks, or other storage devices).

Certain techniques described in this specification may be implemented as operations performed by one or more processors on data stored on one or more computer-readable mediums or received from other sources. The term "processor" may encompass various kinds of apparatuses, devices, or machines for processing data, including by way of example a central processing unit, a microprocessor, a microcontroller, a digital-signal processor, programmable processor, a computer, a system on a chip, or various combinations thereof. The processor may include special purpose logic circuitry, for example, a field programmable gate array or an application-specific integrated circuit.

Program instructions (for example, a program, software, software application, script, or code) may be written in various programming languages, including compiled or interpreted languages, declarative or procedural languages, and may be deployed in various forms, for example as a stand-alone program or as a module, component, subroutine, object, or other unit suitable for use in a computing environment. Program instructions may correspond to a file in a file system. Program instructions may be stored in a portion of a file that holds other programs or data (for example, one or more scripts stored in a markup language document), in a dedicated file or in multiple coordinated files (for example, files that store one or more modules, sub-programs, or portions of code). Program instructions may be deployed to be executed on one or more processors located at one site or distributed across multiple sites connected by a network.

The present technology has now been described in such full, clear, concise and exact terms as to enable any person skilled in the art to which it pertains, to practice the same. It is to be understood that the foregoing describes preferred embodiments and examples of the present technology and that modifications may be made therein without departing from the spirit or scope of the invention as set forth in the claims. Moreover, it is also understood that the embodiments shown in the drawings, if any, and as described above are merely for illustrative purposes and not intended to limit the scope of the invention. As used in this description, the singular forms "a," "an," and "the" include plural reference such as "more than one" unless the context clearly dictates otherwise. Where the term "comprising" appears, it is contemplated that the terms "consisting essentially of" or "consisting of" could be used in its place to describe certain embodiments of the present technology. Further, all references cited herein are incorporated in their entireties.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a plurality of wayside units, each configured for placement on or near tracks in a railway network; and
one or more train-mounted units, each configured for deployment on one of one or more trains operating in the railway network;
wherein at least one train-mounted unit is configured to, when deployed on a train:
communicate with any wayside unit that comes within communication range of the at least one train-mounted unit, wherein the communicating comprises use of ultra-wideband (UWB) signals; and
generate train location information based on communication of UWB signals with at least two different wayside units, wherein generating the train location information comprises:
determining, at a first point from a plurality of points on a track in the railway network as the train moves on the track, based on processing of communicated UWB signals with each wayside unit of the at least two different wayside units, straight line range to each wayside unit of the at least two different wayside units;
re-determining the straight line range to each of the at least two different wayside units at a second point from the plurality of points, when the train moves to the second point, wherein the second point is different from the first point;
determining based on the determined straight line ranges to each wayside unit of the at least two different wayside units, corresponding to the first point and the second point, changes in range ($\Delta R$) to each wayside unit of the at least two different wayside units between the first point and the second point,
determining based on the determined changes in range ($\Delta R$) for both of the at least two different wayside units, corresponding changes in location ($\Delta L$) on the track in the railway network between the first point and the second point as the train moves on the track in the railway network; and
determining based on the determined changes in location ($\Delta L$), a current location of the train on the track in the railway network.

2. The system of claim 1, wherein the at least one train-mounted unit is configured to determine a current location of the train on the track in the railway network based on the determined changes in location ($\Delta L$) and one or more locations on the track.

3. The system of claim 2, wherein the at least one train-mounted unit is configured to determine at least one of the one or more locations on the track based on track related dataset.

4. The system of claim 3, wherein the track related dataset comprises information identifying a plurality of ranging points on the track; and
wherein the at least one train-mounted unit is configured to determine the at least one of the one or more locations on the track based on at least one of the plurality of ranging points.

5. The system of claim 4, wherein the track related dataset comprises information associated with each of the plurality of ranging points, the information identifying one or more of the plurality of wayside units; and
wherein the at least one train-mounted unit is configured to identify the at least one of the plurality of ranging points based on matching at least one wayside unit with one of one or more of the plurality of wayside units identified in information in the track related dataset associated with the at least one of the plurality of ranging points.

6. The system of claim 4, wherein the track related dataset comprises information associated with each ranging point of the plurality of ranging points, the information comprising location corresponding to the ranging point; and
wherein the at least one train-mounted unit is configured to set the at least one of the one or more locations to location in information in the track related dataset associated with the at least one of the plurality of ranging points.

7. The system of claim 1, wherein the at least one train-mounted unit is configured to identify a track in the railway network the train is occupying based on the generating of the train location information.

8. The system of claim 7, wherein the at least one train-mounted unit is configured to, when identifying the track in the railway network the train is occupying:
range to one or more wayside units of the plurality of wayside units; and
determine the track in the railway network based on assessing ranging related information corresponding to the one or more wayside units.

9. The system of claim 8, wherein one or more wayside units are deployed near one of at least two different tracks; and
wherein the at least one train-mounted unit is configured to determine the track in the railway network based on selecting one of the at least two different tracks.

10. The system of claim 9, wherein the at least one train-mounted unit is configured to:
determine one or more possible locations on each of the at least two different tracks based on ranging to the one or more wayside units; and
select the one of the at least two different tracks based on assessing the one or more possible locations.

11. The system of claim 1, wherein the at least one train-mounted unit is configured to control operation of the train based on the generating of the train location information.

12. The system of claim 1, wherein the at least one train-mounted unit is configured to determine one or more train operation parameters based on the generating of the train location information, wherein the one or more train operation parameters comprise at least one of speed and direction of movement.

13. A system comprising:
a train-mounted device that comprise:
an ultra-wideband (UWB) based transmitter, configured for transmitting UWB signals;
an ultra-wideband (UWB) based receiver, configured for receiving UWB signals; and
one or more processing circuits
wherein the train-mounted device is configured to, when deployed on a train:
communicate with any wayside unit, from a plurality of wayside units configured for placement on or near tracks in a railway network, that comes within communication range of the train-mounted device, wherein the communicating comprises use of ultra-wideband (UWB) signals;

generate train location information based on communication of UWB signals with at least two different wayside units, wherein generating the train location information comprises;
   determining, at a first point from a plurality of points on a track in the railway network as the train moves on the track, based on processing of communicated UWB signals with each wayside unit of the at least two different wayside units, straight line range to each wayside unit of the at least two different wayside units;
   re-determining the straight line range to each of the at least two different wayside units at a second point from the plurality of points, when the train moves to the second point, wherein the second point is different from the first point;
   determine based on the determined straight line ranges to each wayside unit of the at least two different wayside units, corresponding to the first point and the second point, changes in range ($\Delta R$) to each wayside unit of the at least two different wayside units between the first point and the second point;
   determine based on the determined changes in range ($\Delta R$) for both of the at least two different wayside units, corresponding changes in location ($\Delta L$) on the track in the railway network between the first point and the second point as the train moves on the track in the railway network; and
   determine based on the determined changes in location ($\Delta L$), a current location of the train on the track in the railway network.

14. The system of claim 13, wherein the train-mounted device is configured to determine a current location of the train on the track in the railway network based on the determined changes in location ($\Delta L$) and one or more locations on the track.

15. The system of claim 14, wherein the train-mounted device is configured to determine at least one of the one or more locations on the track based on track related dataset.

16. The system of claim 15, wherein the track related dataset comprises information identifying a plurality of ranging points on the track; and
   wherein the train-mounted device is configured to determine the at least one of the one or more locations on the track based on at least one of the plurality of ranging points.

17. The system of claim 16, wherein the track related dataset comprises information associated with each of the plurality of ranging points, the information identifying one or more of the plurality of wayside units; and
   wherein the train-mounted device is configured to identify the at least one of the plurality of ranging points based on matching at least one wayside unit with one of one or more of the plurality of wayside units identified in information in the track related dataset associated with the at least one of the plurality of ranging points.

18. The system of claim 16, wherein the track related dataset comprises information associated with each ranging point of the plurality of ranging points, the information comprising location corresponding to the ranging point; and
   wherein the train-mounted device is configured to set the at least one of the one or more locations to location in information in the track related dataset associated with the at least one of the plurality of ranging points.

19. The system of claim 13, wherein the train-mounted device is configured to identify a track in the railway network the train is occupying based on the generating of the train location information.

20. The system of claim 19, wherein the train-mounted device is configured to, when identifying the track in the railway network the train is occupying:
   range to one or more wayside units of the plurality of wayside units; and
   determine the track in the railway network based on assessing ranging related information corresponding to the one or more wayside units.

21. The system of claim 20, wherein one or more wayside units are deployed near one of at least two different tracks; and
   wherein the train-mounted device is configured to determine the track in the railway network based on selecting one of the at least two different tracks.

22. The system of claim 21, wherein the train-mounted device is configured to:
   determine one or more possible locations on each of the at least two different tracks based on ranging to the one or more wayside units; and
   select the one of the at least two different tracks based on assessing the one or more possible locations.

23. The system of claim 13, wherein the train-mounted device is configured to control operation of the train based on the generating of the train location information.

24. The system of claim 13, wherein the train-mounted device is configured to determine one or more train operation parameters based on the generating of the train location information, wherein the one or more train operation parameters comprise at least one of speed and direction of movement.

* * * * *